United States Patent [19]

Postma et al.

[11] Patent Number: 5,531,016
[45] Date of Patent: Jul. 2, 1996

[54] METHOD OF MANUFACTURING A THIN-FILM MAGNETIC HEAD

[75] Inventors: Lambertus Postma; Henricus G. R. Maas; Jan Haisma; Jacobus J. M. Ruigrok; Gerardus H. J. Somers, all of Eindhoven, Netherlands

[73] Assignee: U.S. Philips Corporation, New York, N.Y.

[21] Appl. No.: 216,575

[22] Filed: Mar. 22, 1994

[30] Foreign Application Priority Data

Mar. 22, 1993 [BE] Belgium ............................... 09300274
Apr. 6, 1993 [EP] European Pat. Off. ............. 93200995

[51] Int. Cl.⁶ ..................................................... G11B 5/42
[52] U.S. Cl. ........................ 29/603.16; 360/113; 360/125
[58] Field of Search ............................... 29/607; 360/113, 360/125–127

[56] References Cited

U.S. PATENT DOCUMENTS 4,052,748 10/1977 Kuijk ........................................ 360/113
4,837,924 6/1989 Lazzari ..................................... 29/603
5,284,572 2/1994 Somers et al. ........................ 29/603 X

FOREIGN PATENT DOCUMENTS 92201739  9/1992  European Pat. Off. .
 0516022  12/1992  European Pat. Off. .
01289224  4/1987  Japan .
62092219  11/1989  Japan .

OTHER PUBLICATIONS

IBM Technical Disclosure Bulletin, vol. 27, No. 8, Jan. 1985, "Glass Planarization By Stop–Layer Polishing" by K. D. Beyer et al, pp. 4700–4701.

*Primary Examiner*—Carl E. Hall
*Attorney, Agent, or Firm*—John C. Fox

[57] ABSTRACT

Method of manufacturing a thin-film magnetic head in which a main layer (5) of a non-magnetic material is formed on a support, which layer is recessed by removing material from a side remote from the support, said recess being subsequently filled up with a soft-magnetic material for forming a flux guide (17a, 17b), whereafter the main layer provided with the filled recess is mechanochemically polished for forming a main surface (19) at which subsequently a layer of a magnetoresistive material is provided for forming a magnetoresistive element (23).

28 Claims, 9 Drawing Sheets

METHOD OF MANUFACTURING A THIN-FILM MAGNETIC HEAD

BACKGROUND OF THE INVENTION

The invention relates to a method of manufacturing a thin-film magnetic head comprising a magnetoresistive element and at least one flux guide, which method starts from a support.

Methods of manufacturing thin-film magnetic heads are known, inter alia from EP-A 0 516 022 (herewith incorporated by reference). The magnetic heads obtained by the methods described in EP-A 0 516 022 are integrated magnetic heads having a contact face and comprising an inductive part and a magnetoresistive part.

In accordance with a first method known from EP-A 0 516 022, a first structured insulation layer of $SiO_2$ is formed on a magnetic substrate of a ferrite by means of a lithographic method, which layer is subsequently provided with a layer of Au for forming a write coil. Subsequently, a second structured insulation layer is provided on which a core layer of an amorphous material based on Co is deposited. This core layer is in contact with the magnetic substrate via apertures in the insulation layers. The parts of the second insulation layer not coated by the core layer are filled up by means of a filling layer of $Al_2O_3$. After the filling layer has been formed, the core layer and the filling layer are planed by means of lapping. A third structured insulation layer of $SiO_2$ is deposited on the surface thus obtained on which subsequently a bias winding of Au is formed. A fourth structured insulation layer of $SiO_2$ is provided on this winding. Subsequently, a magnetoresistive element of permalloy is formed on this insulation layer. Then a fifth structured insulation layer of $SiO_2$ is provided and subsequently a yoke of an amorphous material which is based on Co and is in contact with the core layer via apertures in the three last-mentioned insulation layers.

In accordance with a second method known from EP-A 0 516 022, two flux guides of a Co-based amorphous material are provided on a non-magnetic substrate, while an aperture between the two flux guides is filled with a first insulation layer of $SiO_2$. The surface formed by the flux guides and the first insulation layer is provided with a second structured insulation layer on which subsequently a magnetoresistive (MR) element is formed. The MR element is then coated with a third structured insulation layer on which subsequently a bias winding is formed. A fourth structured insulation layer is provided for the purpose of coating the bias winding. Subsequently a magnetic core layer of a Co-based material is formed which is in contact with one of the flux guides via apertures in the three last-mentioned insulation layers. The areas not coated by the first core layer are filled up with a filling layer of $Al_2O_3$, whereafter a surface on which an inductive head part is formed is obtained by lapping.

In the methods known from EP-A 0 516 022, the MR element is formed on an insulation layer which is provided on a lapping-processed surface. However, it has been found that such a surface extending on two or more adjacent layers of different material has unevennesses. Moreover, damage particularly in the form of scratches in and disturbances of material under the surface obtained are caused by lapping. Such a surface is inadmissible, inefficient for information transfer and may increase the risk of instabilities in the MR element provided on said surface.

The magnetic heads obtained by the methods known from EP-A 0 516 022 have the further drawback that due to the presence of irregularities on the surface engaging the MR element, a relatively thick insulation layer is required between the MR element and the electrically conducting flux guides so as to ensure a reliable electrical insulation between the MR element and the flux guides. However, such insulation layers have a further negative influence on the efficiency of the magnetic heads. For various reasons, damage in and material disturbance under a surface above which the MR element is present are thus undesirable.

OBJECTS AND SUMMARY OF THE INVENTION

It is an object of the invention to provide a method of manufacturing a thin-film magnetic head having a magnetoresistive element and at least one flux guide, in which the magnetoresistive element is provided on a surface which is accurately defined as regards planeness and structure.

The method according to the invention is therefore characterized in that a main layer of a non-magnetic material is formed on the support, which layer is provided with a recess by removing material from a side remote from the support, said recess being subsequently filled up with a soft-magnetic material for forming the flux guide, whereafter the main layer provided with the filled recess is mechanochemically polished for forming a main surface at which subsequently a layer of a magnetoresistive material is provided for forming the magnetoresistive element.

In the method according to the invention the magnetic flux guide is provided in the main layer which itself is non-magnetic. Consequently, the mechanochemical polishing operation is performed on soft-magnetic material as well as on non-magnetic material. It has surprisingly been found that despite the different material properties between the soft-magnetic and the non-magnetic material the mechanochemical polishing operation yields a very plane and smooth main surface without the materials themselves being subject to structural changes. In the method according to the invention a polished, plane surface which is free from damage is obtained for the purpose of providing the magnetoresistive element (MR element) in an electrically insulated manner, which results in a magnetic head having a stable MR element and an efficiency which is improved with respect to that of the known magnetic heads.

Nucleation of domain walls or formation of small areas having an unwanted direction of magnetization and unwanted, sudden changes of magnetization during the read process are obviated as much as possible in a magnetoresistive element which is free from defects.

It is to be noted that mechanochemical polishing is performed with the aid of a working surface of a polishing tool which is urged against and moved across the surface to be polished. The working surface is provided with a liquid mechanochemical polishing agent. This is an agent with which chemical and mechanical polishing is simultaneously possible.

It is further to be noted that polishing without damage can be realised by purely chemical polishing. This method has drawbacks. The geometrical control, i.e. the planeness of the surface is far from optimal and many chemical polishing agents are more or less toxic and aggressive and should consequently be used in an extremely protected environment, which is a drawback in mass production. The mechanochemical polishing operation, in which components mechanically removed from the surface to be polished are chemically dissolved, leads to a very smooth and plane polished surface which is free from damage. It has surprisingly been found that if one of the components to be polished is very hard, the mechanical aspect of mechanochemically polishing will be enhanced by adding a small quantity of hard, adequate grains to the polishing agent of the mechanochemical type. Thus, even when very hard materials are used in the manufacture of heads, a smooth and plane surface which is free from damage can be realised.

An embodiment of the method according to the invention is characterized in that a plate-shaped substrate is used as a support which is provided with two parallel substrate faces by means of mechanical and/or mechanochemical polishing, whereafter the main layer is formed on one of these faces. The other face is used as a reference face in the further process steps.

The parallel substrate faces may be obtained by starting from a substrate having two substrate faces, the substrate faces being first prepared by means of polishing until they have a convex, plane or concave initial shape, whereafter a removal cycle is run through at least once, during which the substrate faces of a substrate whose edges are thicker than a central piece surrounded by the edges are polished in such a way that the edges successively acquire a substantially equal thickness, a smaller thickness and again a substantially equal thickness as the central piece, and during which cycle the substrate faces of a substrate whose edges are thinner than a central piece surrounded by the edges are polished in such a way that the edges successively acquire a substantially equal thickness, a larger thickness and again a substantially equal thickness as the central piece. The above-mentioned method of manufacturing parallel faces is described extensively in European Patent Application 92201739.7 (corresponds to U.S. Patent application Ser. No. 071,908, filed Jun. 3, 1993); herewith incorporated by reference).

Substrates having parallel substrate faces have the great advantage that they can be used in a mass manufacturing process for the further steps of the method. Consequently, mechanochemical polishing steps can be performed at a later stage for the purpose of smoothing and planing a layer having a single or multiple material structure and for stop-polishing a layer having a multiple material structure, but of which only one or some materials of the layer can be polished via the mechanochemical polishing process and the other material cannot be polished.

An embodiment of the method is characterized in that the support is formed from a soft-magnetic material, particularly a ferrite.

It is to be noted that a ferrite is understood to be a magnetic material of, for example one of the following crystallographic groups: garnets, spinels, perovskites. Favourable properties of ferrite are its great wear resistance and its satisfactory shielding effect against disturbing fields. The stability of the magnetoresistive head is usually also favourably influenced by the effect of the ferrite on the thin-film flux guide or flux guides and the magnetoresistive element. Moreover, a ferrite support has the technological advantage that the support can be used as a flux-guiding layer.

An embodiment is characterized in that the support is formed from an assembly which is built up from a base, a base layer of a non-magnetic material provided on the base, with an inductive transducing element and a flux-guiding element being present in the base layer, whereafter the assembly is mechanochemically polished to form a base surface for providing the main layer. The base layer may be provided with an aperture by removal of material from a side remote from the base, which aperture is subsequently filled up with a soft-magnetic material for forming the flux-guiding element. This method yields a magnetic head having a write function as well as a read function. During the method a write portion and subsequently a read portion is formed. In order to ensure an accurately defined main surface, the base layer serving as a sub-layer for the main layer is also mechanochemically polished in this embodiment. A magnetical advantage on making a planar write portion cannot be achieved. However, planarity is necessary to obtain the planar read portion having the previously mentioned advantages. Preferably the aperture in the base layer is provided by means of etching.

An embodiment is characterized in that a plate-shaped body is used as a base, which body is provided with two parallel body faces by means of mechanical and/or mechanochemical polishing, whereafter the base layer is formed on one of these faces. The parallel body faces may be obtained by means of the method described in European Patent Application no. 92201739.7 (corresponds to U.S. application Ser. No. 071,908). Also in this case substrates with parallel substrate faces have advantages as far as mass manufacture, mechanochemical polishing of single materials, mechanochemical polishing of distributed materials and mechanochemical stop-polishing are concerned.

An embodiment is characterized in that the base is formed from a magnetic material, particularly a ferrite.

An embodiment is characterized in that the main layer is formed from zirconia. Zirconia is a crystalline material in a cubic form. The main constituent is $ZrO_2$ to which 5–10 at. % of $CaO$ or $Y_2O_3$ are added. Zirconia, which may be provided, for example by sputtering, is a mechanically hard and wear-resistant material. With all soft-magnetic materials to be further described, zirconia forms a substantially perfect main surface after mechanochemical polishing. This is probably due to the great hardness of zirconia.

From a polishing-technical point of view, zirconia is an eminently suitable material for use as a stopper layer in a mechanochemical polishing step. Since the thickness of zirconia layers can be realised with nanometer precision, plane layers of the thin-film magnetic head can be made with the same precision. Zirconia is, however, slowly etchable.

An embodiment is characterized in that the main layer is formed from quartz. Quartz may be provided, for example by means of PE CVD. It has been found that the soft-magnetic material of the flux guide has hardly any influence on the eminent result of the mechanochemical polishing process, notably in so far as the surface is plane and free from damage, provided that there is a good adhesion between the soft-magnetic material and the quartz.

It is to be noted that, as compared with zirconia, the much softer quartz can be subjected to a similar polishing treatment when the mechanochemical polishing process is optimized. Although the polishing process is more critical and accuracy of size is difficult to achieve, quartz has the advantage that it can be etched easily and relatively rapidly.

An embodiment is characterized in that the recess in the main layer is formed by means of etching. The etching operation is critical because the result of the etching operation defines the non-magnetic gap which is characteristic of the read portion. Reproducibility is the paramount requirement imposed on the etching operation. Therefore, sputter-etching and reactive ion etching and, to a lesser extent, plasma etching and wet-chemical etching are preferred.

An embodiment is characterized in that a spacer layer of a non-magnetic electrically insulating material, on which the layer of a magnetoresistive material is provided, is formed on the main surface obtained by means of mechanochemical polishing. This embodiment is particularly important if use is made of electrically conducting soft-magnetic materials for forming the flux guide. In that case an insulating spacer layer is necessary in order to prevent electrical contact between the flux guide and the MR element. A drawback of a magnetic head having a spacer layer between the MR element and the flux guide is, however, that due to the distance between the MR element and the flux guide caused by the thickness of the layer only a portion of the magnetic flux originating during operation from a magnetic recording medium is passed through the MR element. Consequently, for reasons of efficiency, it is of essential importance that such a layer can be made as thin as possible. Since the thickness of the spacer layer is determined to a considerable extent by the quality of the main surface, this spacer layer may be perfectly smooth and have no variations in thickness when the method according to the invention is used, and moreover it may be very thin, for example 0.2 μm with respect to the layer thicknesses of at least 0.6 μm required in the known magnetic heads, without any risk of short-circuit of the MR element.

An embodiment is characterized in that an alloy from the group of alloys formed by CoZrNb alloys, FeNbSi alloys, FeSiAl alloys and NiFe alloys is used as a soft-magnetic material. These materials may be provided by means of known techniques such as sputtering or vapour deposition.

An embodiment is characterized in that a ferrite is used as a soft-magnetic material. A ferrite usually has such a high resistivity that the MR element can be directly provided on the flux guide formed from such a material without resulting in any noticeable loss of sensitivity of the magnetic head. In other words, when ferrite is used, in which MnZn ferrite and NiZn ferrite are preferred, the spacer layer may be omitted in the method according to the invention and the layer of a magnetoresistive material may thus be directly provided on the main surface for forming the MR element. Consequently, a direct magnetic coupling between the MR element and the flux guide is possible. Such a coupling results in a high efficiency of the magnetic head obtained. Ferrites can be provided by means of known techniques such as sputtering, MO-CVD or laser ablation.

The magnetic head obtained by means of the method according to the invention is provided with a head face for cooperation with a magnetic recording medium, particularly a magnetic tape or disc, while the flux guide terminates in the head face. In this connection a ferrite flux guide has the advantage that the ferrite contributes to the corrosion resistance and the wear resistance of the head face.

An embodiment is characterized in that an NiFe alloy is used as a magnetoresistive material. The NiFe alloy can be provided by means of known techniques such as sputter-deposition or vapour deposition. The MR element formed from NiFe is provided with contact faces for realising an electrical connection with a read device. Preferably, equipotential strips having a satisfactory electrical conductivity are provided on the NiFe layer formed so as to linearize the behaviour of the MR element. This measure is described in U.S. Pat. No. 4,052,748 (herewith incorporated by reference).

An embodiment is characterized in that the base layer is formed from zirconia. In this respect zirconia is a satisfactory polish stopper material in the mechanochemical polishing process. A drawback of zirconia is that it is slowly etchable, but an important advantage is that accuracy of size is optimally achievable.

An embodiment is characterized in that the base layer is formed from quartz. Quartz is not such a good polish stopper material in the mechanochemical polishing process as compared with zirconia, while a subtler accuracy of size should be achieved. However, an advantage is that it can be satisfactorily provided and is easily etchable.

An embodiment is characterized in that the mechanochemical polishing treatment is performed with a colloidal suspension of $SiO_2$ particles in an alkali solution, particularly a KOH or NaOH solution. A colloidal suspension of $SiO_2$ nano particles may be used for this purpose, having, for example an average grain size of 30 nm and a pH of approximately 10 in a NaOH or KOH solution.

It is to be noted that mechanochemical polishing is known per se from IBM Technical Disclosure Bulletin, vol 27, no. 8, Jan. 1985. This publication describes mechanochemical polishing of a glass structure. It is also known per se to use an agent commercially available under the trade name Syton for the mechanochemical polishing process.

An embodiment is characterized in that the mechanochemical polishing treatment is performed with a mechanochemical polishing agent comprising a colloidal $SiO_2$ solution in which grains are present which have an average particle size of less than 1.0 micrometer and a hardness which is better than the hardness of $SiO_2$. With this method according to the invention the main layer can be provided with a very smooth mechanochemically polished surface. It has been found that a surface roughness R(rms) of the polished surface smaller than 1 nm can be achieved. Measurements have shown that the material structure of the mechanochemically polished surface is not damaged. The above also applies to mechanochemical polishing of the substrate and the base layer.

The exact effect of the above-mentioned mechanochemical polishing agent is not known. It is assumed that, in solution, the grains are enveloped by $SiO_2$ nano particles due to electrostatic forces, which enveloped particles chemically and mechanically attack the surface to be polished, while chemically attacked parts of the surface to be polished are relatively easily removed under mechanical pressure.

Experiments have proved that optimum polishing results are achieved at an average particle size of less than 1.0 μm. It is therefore preferred to use grains whose average particle size is less than 1.0 micrometer, for example 100 nanometer. It is also preferred that the concentration of the grains in the colloidal solution is less than 1 g per liter. This solution is preferably alkaline and is, for example a KOH or NaOH solution.

$Al_2O_3$ or zirconia is suitable as a material for the grains, but diamond is preferred because the materials are to be polished. A colloidal $SiO_2$ solution provided with diamond grains having an average particle size of less than 1.0 μm is therefore preferred as a polishing agent.

The invention also relates to a thin-film magnetic head obtained by means of the method according to the invention and having a head face for cooperation with a magnetic recording medium. The magnetic head according to the invention is characterized in that the flux guide of a soft-magnetic material extends in the main layer of a non-magnetic material. In this magnetic head the magnetoresistive element has a very plane, accurately defined base, so that the magnetical stability of the magnetoresistive element is ensured. Due to the applied method according to the invention, corrosion-resistant and/or wear-resistant materials may be used for layers terminating in the head face, so that a long lifetime of the head face, hence of the complete magnetic head, is possible.

A practical embodiment of the magnetic head according to the invention is characterized in that a further flux guide of a soft-magnetic material spaced apart from said flux guide extends in the main layer of a non-magnetic material, one of the flux guides terminating in the head face and a spacing being bridged by the magnetoresistive element located opposite the mechanochemically polished main layer.

The invention also relates to a thin-film magnetic head having a head face and being obtainable by means of the method according to the invention, which magnetic head is characterized in that a support is provided on which a main layer of a non-magnetic material extends, which main layer has at least one recess accommodating a flux guide of a soft-magnetic material at a side remote from the support, the main layer and the flux guide at said side constituting a main surface obtained by means of mechanochemical polishing, which main surface is provided with a magnetoresistive element. The main surface, which is obtained by means of a mechanochemical polishing process, can be considered to be completely plane and free from damage. A substrate, preferably a ferrite substrate, or an assembly provided with an inductive element may be used as a support.

These and other aspects of the invention will be apparent from and elucidated with reference to the embodiments described hereinafter.

DESCRIPTION OF THE PREFERRED EMBODIMENTS

Figure 1:
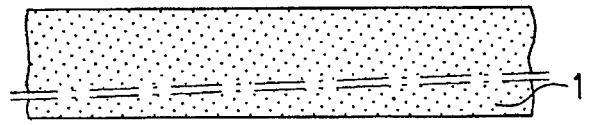
FIGS. 1 to 15 show various steps of a first embodiment of the method according to the invention.
Figure 2:
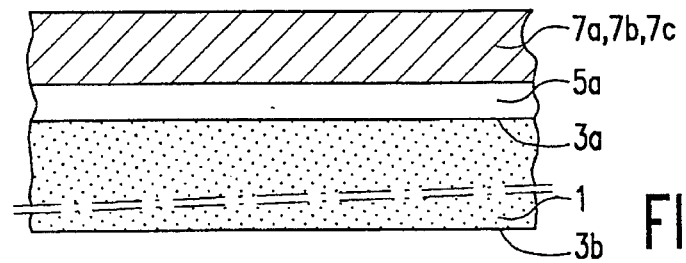
Figure 3:
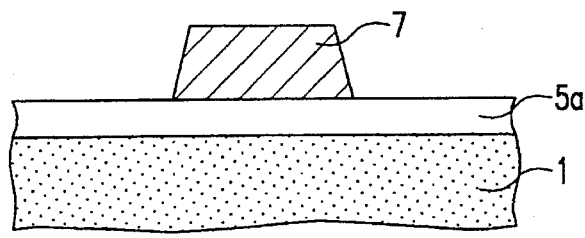
Figure 4:
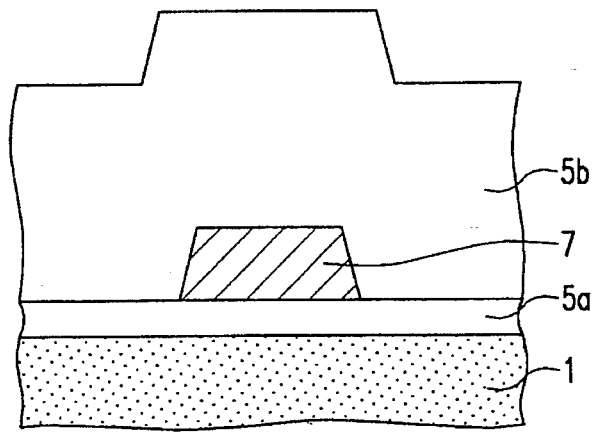
Figure 5:
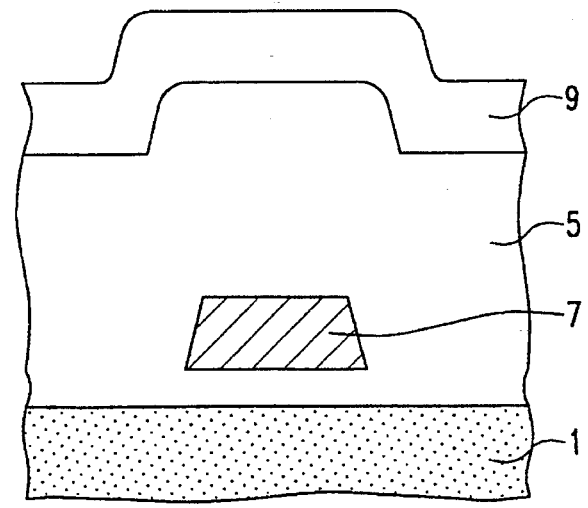
Figure 6:
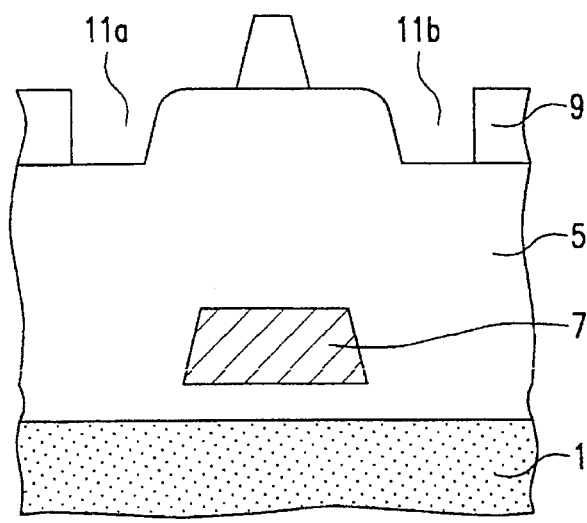
Figure 7:
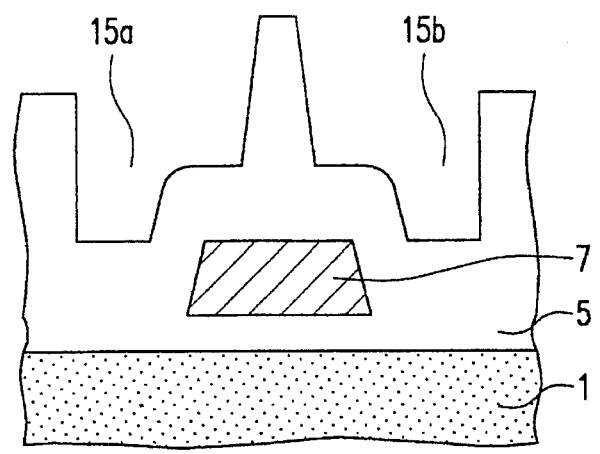
Figure 8:
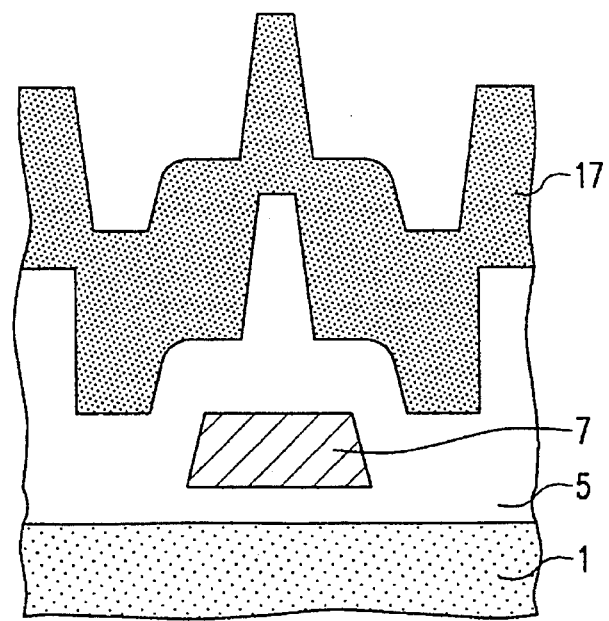
Figure 9:
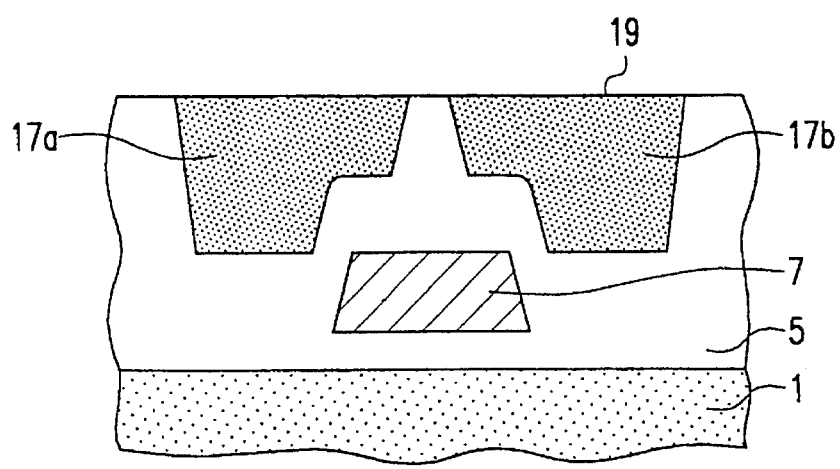
Figure 10:
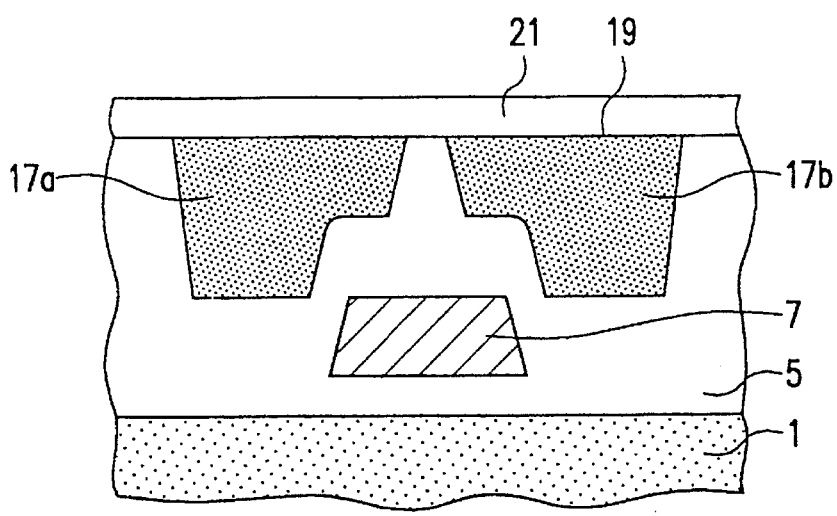
Figure 11:
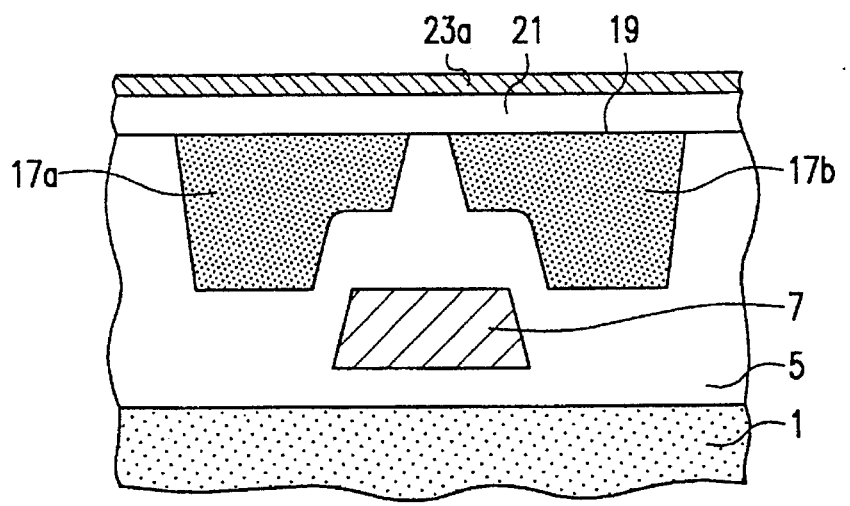
Figure 12:
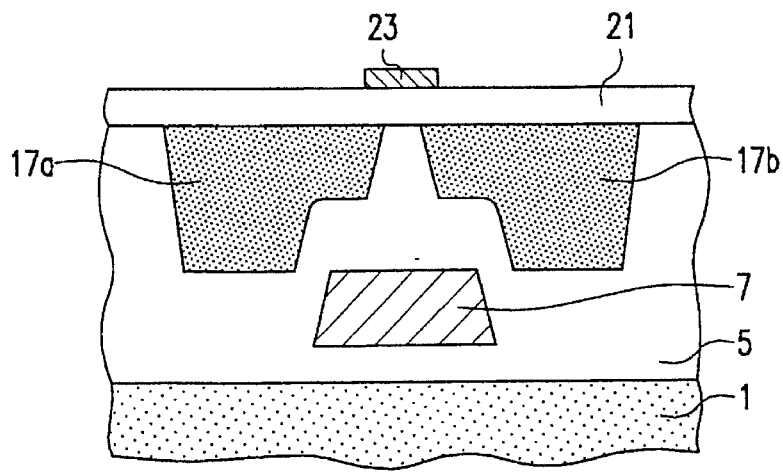
Figure 13:
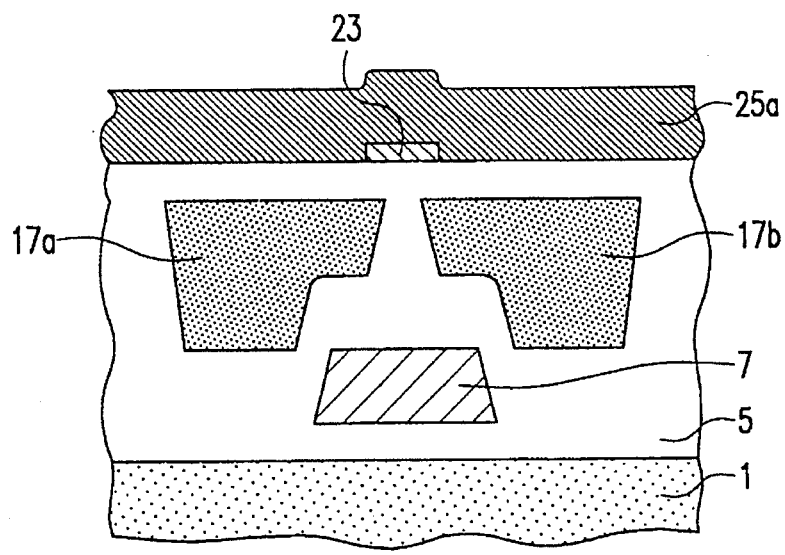
Figure 14:
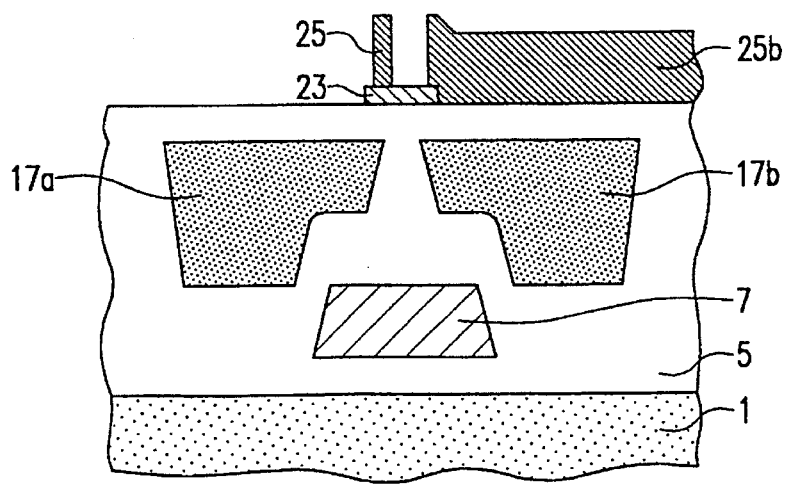
Figure 15:
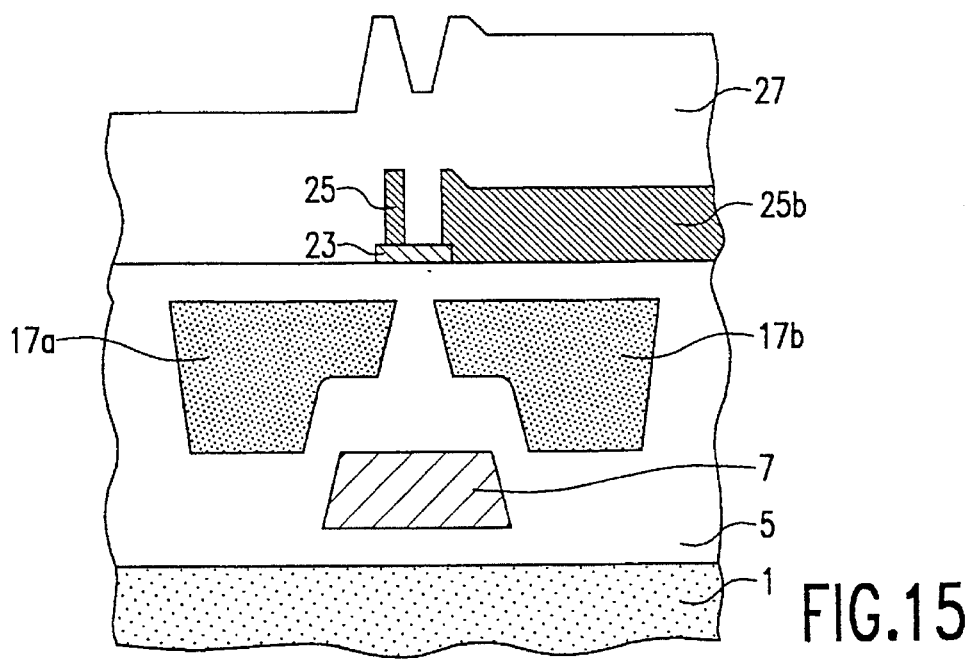

A first embodiment of the invention will be described with reference to FIGS. 1 to 16. This method starts from a plate-shaped substrate 1 of ferrite, an NiZn ferrite in this embodiment, which is provided with two parallel substrate faces 3a and 3b by means of polishing. Polishing may be effected by means of known polishing methods, but the method described in European Patent Application no. 92201739.7 U.S. application Ser. No. 071,908 is preferably used. An insulation layer 5a of zirconia is formed on one of the substrate faces, in this embodiment the substrate face 3a, for example, by means of sputter-deposition. Subsequently, an adhesive layer 7a of Mo, a layer 7b of Au and an adhesive layer 7c of Mo are successively deposited on the layer 5a by means of, for example sputtering for forming a test and/or bias winding 7. A photoresist layer is provided by means of, for example spin coating on the joint layers 7a, 7b, 7c. This layer is dried and subsequently exposed, using a suitable photomask. Subsequently the exposed photoresist is developed and then removed by rinsing in water. After subsequent heating and cooling, the layer 7c of Mo is etched whereafter the unexposed photoresist is removed by means of acetone and the layer 7b of Au is processed by means of sputter-etching with an Mo pattern as a mask. The winding 7 is obtained by subsequent etching of the Mo layer 7c.

An insulation layer 5b of zirconia is provided by means of, for example sputtering on the layer 5a and the winding 7 on this layer. The layers 5a and 5b jointly constitute a relatively thick main layer 5 of a non-magnetic material. The thickness of the layer 5 is 1.1 μm in this embodiment. An Mo layer 9 is provided, for example by means of sputter-deposition on the main layer 5 provided on the substrate 1 which functions as a support, whereafter Mo is removed in two areas 11a and 11b by means of etching. Subsequently a sputter-etching treatment takes place, with the layer 9 functioning as a mask and two recesses 15a and 15b being formed in the main layer 5. After sputter-etching the remaining pans of the layer 9 are removed, for example by wet-chemical etching. A layer 17 of a soft-magnetic material is provided on the main layer 5 thus structured, and the recesses 15a and 15b are completely filled up for forming two flux guides 17a and 17b. In this embodiment the layer 17 is formed by sputter-deposition of an FeNbSi alloy. By heating this material after sputtering in a magnetic field, a layer is obtained which is magnetically soft and mechanically hard and wear-resistant. Instead of an FeNbSi alloy, it is alternatively possible to use a CoZrNb alloy, an FeSiAl alloy or an NiFe alloy. The main layer provided with the filled recesses 15a and 15b is mechanochemically polished for forming a substantially perfectly plane and smooth main surface 19, pan of which is formed by the insulation material of the main layer 5 and another pan of which is formed by the soft-magnetic material of the flux guides 17a and 17b.

Mechanochemical polishing, which is also referred to in literature as tribo-chemical polishing, is realised in this embodiment with a colloidal suspension of $SiO_2$ particles in an alkali solution.

A thin spacer layer 21 of a non-magnetic, electrically insulating material is provided on the plane, defectless main surface 19 obtained in the manner described above. In this embodiment zirconia is sputtered for this purpose. A layer 23a of a magnetoresistive material is provided on the layer 21, for which purpose an alloy of NiFe is sputtered in this embodiment. The layer 23a is subsequently structured by means of a photoresist mask and etching to form an MR element 23. A layer 25a of an electrically conducting material, for example Au is provided on the MR element 23, which layer is structured by means of a photoresist mask and etching to form equipotential strips 25 of a barberpole structure and to form electrically conducting strips 25b for electrically connecting the MR element to a measuring device (not shown). Subsequently an insulation layer 27 of, for example zirconia is provided by means of, for example sputter-deposition. Apertures 29 extending as far as the conducting strips 25b are etched in this insulation layer in order to provide electrical connections, whereafter a protective counterblock 31 of, for example $BaTiO_3$ or $CaTiO_3$ is secured by means of, for example an adhesive. The layer 27 may be planed to a desired thickness in advance, for example by mechanical polishing or lapping. The unit now obtained is provided with a head face 33 for cooperation with a magnetic recording medium, particularly a magnetic tape by means of operations such as grinding and/or lapping.

Figure 16:
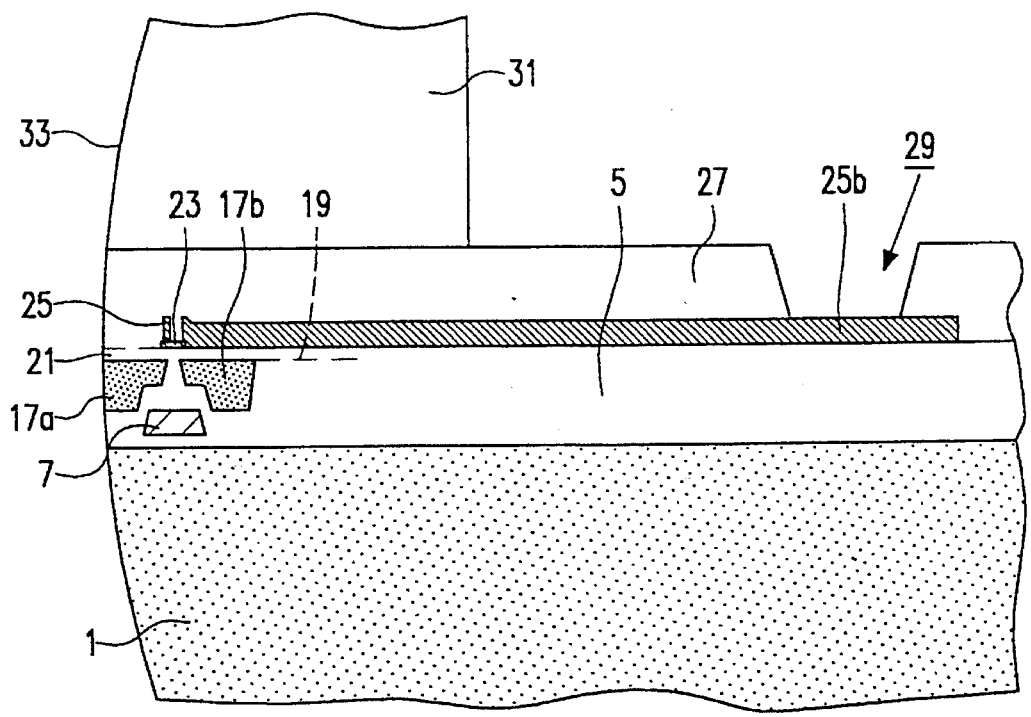
FIG. 16 shows a thin-film magnetic head according to the invention manufactured by means of the first embodiment of the method according to the invention.
Figure 17:
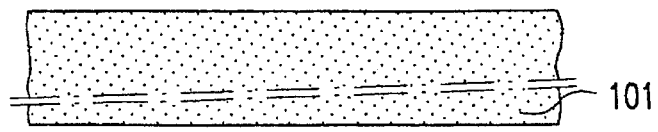
FIGS. 17 to 28 show various steps of a second embodiment of the method according to the invention.
Figure 18:
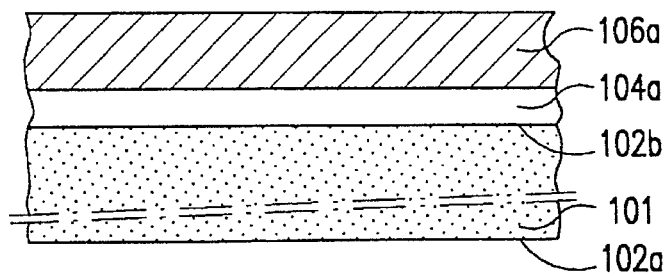
Figure 19:
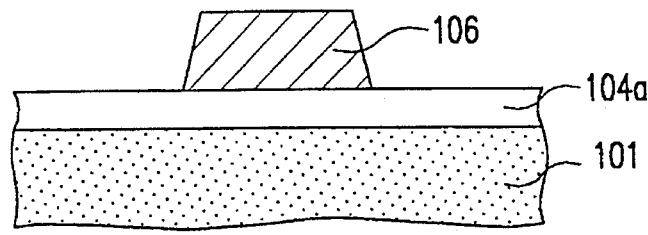
Figure 20:
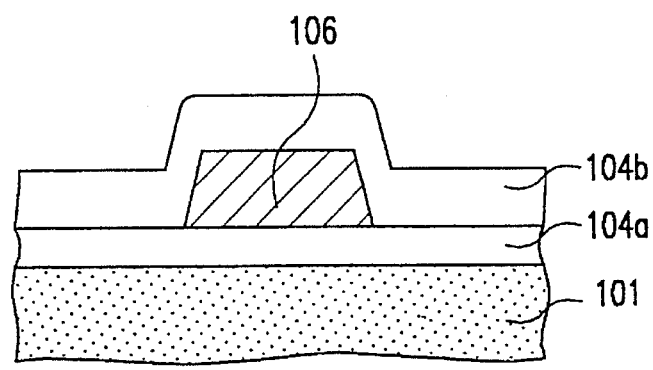
Figure 21:
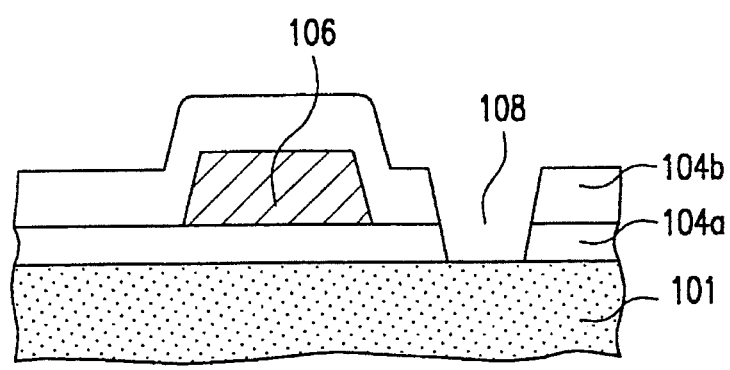
Figure 22:
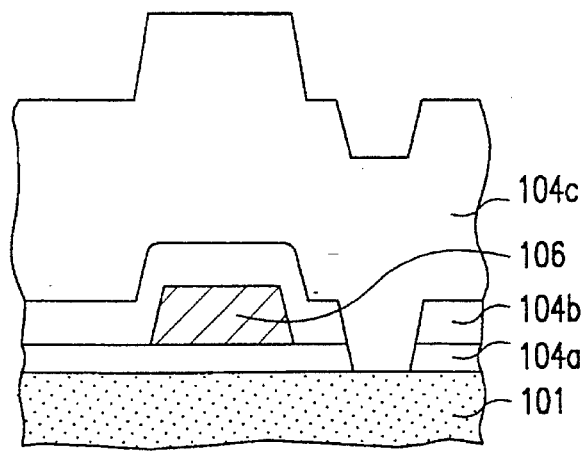
Figure 23:
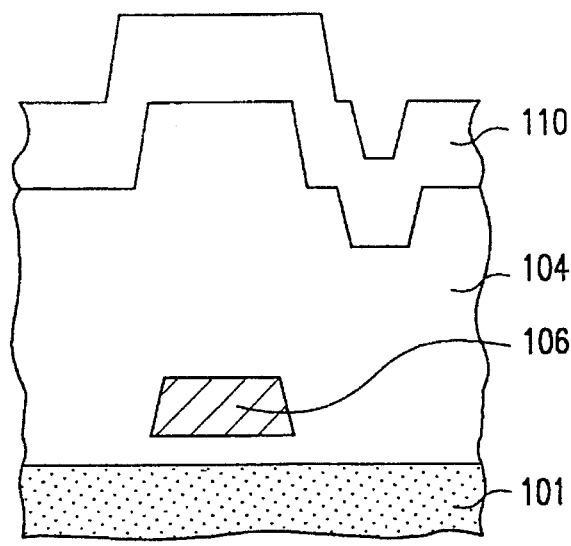
Figure 24:
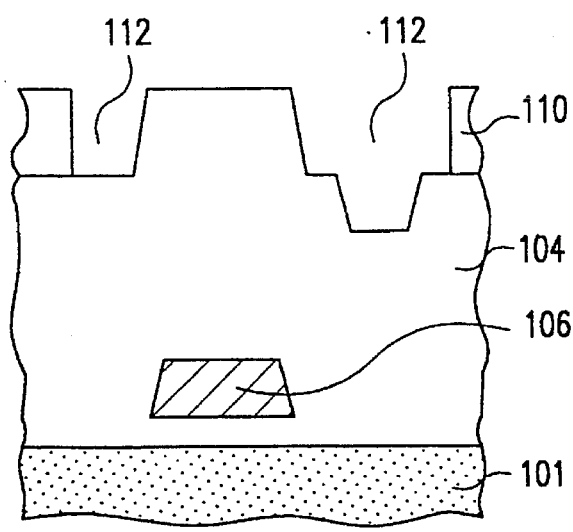
Figure 25:
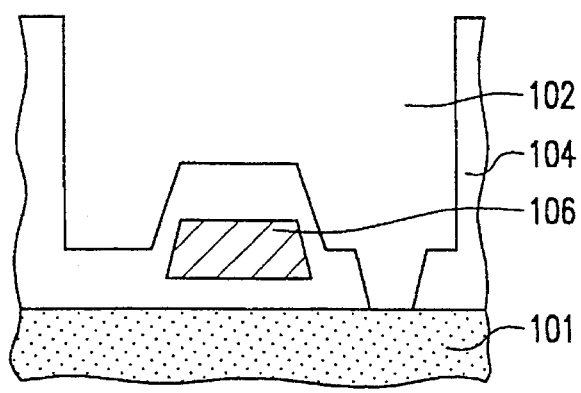
Figure 26:
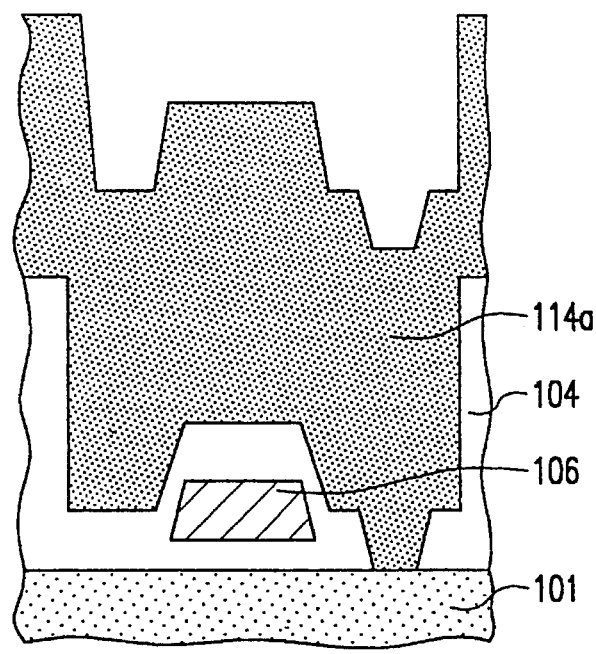
Figure 27:
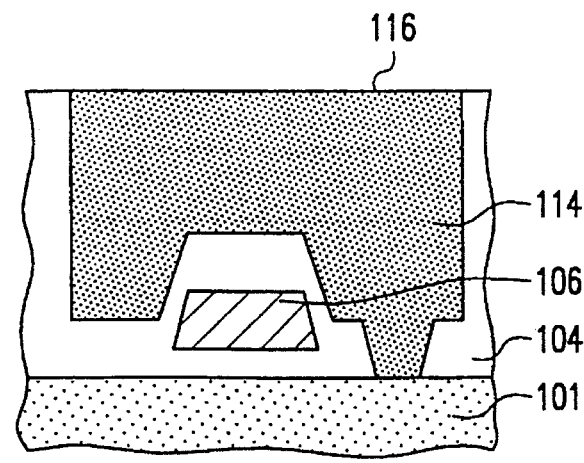
Figure 28:
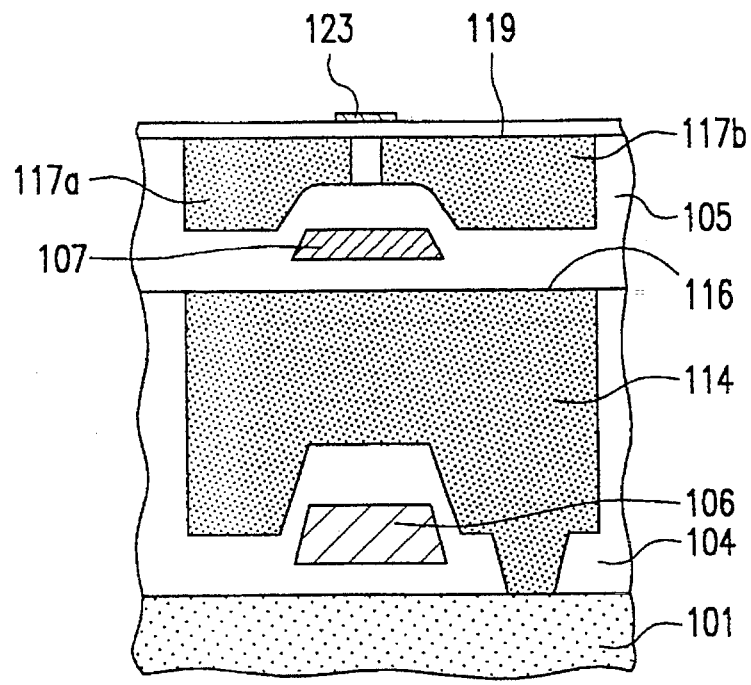

If the soft-magnetic material of the flux guides 17a and 17b in the thin-film magnetic head according to the invention shown in FIG. 16 is replaced by a soft-magnetic material which does not conduct electrically or has a poor electrical conductance, particularly an MnZn ferrite, an NiZn ferrite or $Fe_2O_3$ ferrite, the MR element 23 may be directly provided on the main surface 19. Consequently, the insulation layer 21 may be dispensed with and the MR element 23 may be in direct magnetical contact with the flux guides 17a and 17b.

A second embodiment of the method according to the invention will be described with reference to FIGS. 17 to 28. This method starts from a plate-shaped body 101, preferably of ferrite which is polished on both sides for forming two parallel body faces 102a and 102b. An insulation layer 104a of quartz is provided by means of, for example PE CVD on one of the body faces, in this embodiment the face 102b. An electrically conducting layer 106a of, for example mainly Au is provided on the layer 104a. This layer 106a is structured by means of known techniques to form an inductive transducing element or winding 106. Subsequently quartz is deposited for forming an insulation layer 104b and an aperture 108 is etched in the two insulation layers 104a and 104b. Subsequently a relatively thick insulation layer 104c of quartz is provided. The layers 104a, 104b and 104c jointly constitute a base layer 104 of a non-magnetic material. A layer 110 of a mask material, for example Mo is provided on the base layer 104 provided on the body 101 functioning as a base, with which mask material layer an aperture 112 is formed in the base layer 104. To this end, a photoresist is first deposited and structured on the layer 110, whereafter apertures 112 are formed in the layer 110 by means of etching for forming a mask. Subsequently, the base layer 104 is sputter-etched with the structured layer 110 as a mask for forming the aperture 102. After sputter-etching the remaining parts of the layer 110 are removed by wet-chemical etching. A layer 114a of a soft-magnetic material, for example a CoZrNb alloy is provided on the base layer 104 thus structured, while the aperture 102 is completely filled up. The layer 114a is used for forming a flux-guiding element 114. The base layer 104 provided with the filled aperture 102 is subsequently mechanochemically polished by means of a colloidal suspension of $SiO_2$ particles in a KOH or NaOH solution to which diamond particles having an average particle size of less than 1.0 µm are added for creating a plane base surface 116 which is free from scratches. The concentration of diamond particles in said solution is less than 1 g per liter. The assembly thus formed from the body 101, the base layer 104 and the inductive transducing element 106 is used as a support for a main layer 105 of a non-magnetic material.

Flux guides 117a and 117b are provided in the main layer 105 in a manner analogous to that described with reference to the first embodiment of the method according to the invention. In this method a main surface 119 is also formed by means of mechanochemical polishing, whereafter an MR element 123 is provided.

Figure 29:
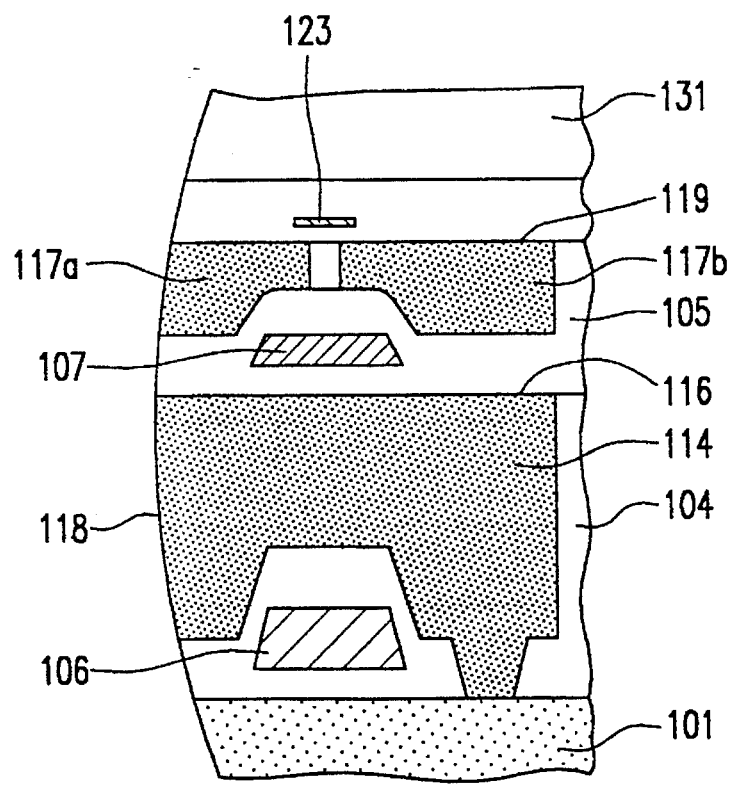
FIG. 29 shows a thin-film magnetic head according to the invention manufactured by means of the second embodiment of the method according to the invention.

A thin-film magnetic head manufactured by means of the second embodiment of the method according to the invention is shown in FIG. 29. The magnetic head has a head face 118 and comprises a body 101 serving as a base on which a non-magnetic base layer 104 is provided. The base layer 104 accommodates a winding 106 serving as an inductive transducing element and a flux-guiding element 114 of a soft-magnetic material terminating in the head face 118. A non-magnetic main layer 105 accommodating a rear flux guide 117a and a front flux guide 117b terminating in the head face 118 is provided on a mechanochemically polished base surface 116. Both flux guides are formed from a soft-magnetic material. If desired, a bias winding 107 may extend in the main layer 105. The main layer 105 has a mechanochemically polished main surface 119 on which—with a thin insulation layer being interpositioned—an MR element 123 is provided directly or indirectly. A protective layer, against which a counterblock 131 is secured, extends on the MR element.

It is to be noted that the invention is of course not limited to the embodiments shown. For example, within the scope of the invention it is possible to structure the soft-magnetic layer 114a by means of etching so as to form the flux-guiding element 114.

We claim:

1. A method of manufacturing a thin-film magnetic head comprising a magnetoresistive element and at least one flux guide on a support, the method characterized by forming a main layer of a nonmagnetic material on the support, providing a recess in the layer by removing material from a side of the layer remote from the support, subsequently filling up the recess with a soft-magnetic material to form the flux guide, thereafter mechanochemically polishing the main layer provided with the filled recess to form a main surface, and providing a layer of a magnetoresistive material on the main surface to form the magnetoresistive element.

2. A method as claimed in claim 1, characterized in that a plate-shaped substrate is used as a support which is provided with two parallel substrate faces by means of mechanical and/or mechanochemical polishing, whereafter the main layer is formed on one of said faces.

3. A method as claimed in claim 1, characterized in that the support is formed from a soft-magnetic material.

4. A method as claimed in claim 1, characterized in that the support is formed from an assembly which is built up from a base, a base layer of a non-magnetic material provided on the base, with an inductive transducing element and a flux-guiding element being present in the base layer, whereafter the assembly is mechanochemically polished to form a base surface for providing the main layer.

5. A method as claimed in claim 4, characterized in that a plate-shaped body is used as a base, which body is provided with two parallel body faces by means of mechanical and/or mechanochemical polishing, whereafter the base layer is formed on one of said faces.

6. A method as claimed in claim 4, characterized in that the base is formed from a soft-magnetic material.

7. A method as claimed in claim 1, characterized in that the main layer is formed from zirconia.

8. A method as claimed in claim 1, characterized in that the main layer is formed from quartz.

9. A method as claimed in claim 1, characterized in that the recess in the main layer is formed by means of etching.

10. A method as claimed in claim 1, characterized in that a spacer layer of a non-magnetic electrically insulating material, on which the layer of a magnetoresistive material is provided, is formed on the main surface obtained by means of mechanochemical polishing.

11. A method as claimed in claim 10, characterized in that an alloy from the group of alloys formed by CoZrNb alloys, FeNbSi alloys, FeSiAl alloys and NiFe alloys is used as a soft-magnetic material.

12. A method as claimed in claim 1, characterized in that a ferrite is used as a soft-magnetic material.

13. A method as claimed in claim 1, characterized in that an NiFe alloy is used a magnetoresistive material.

14. A method as claimed in claim 4, characterized in that the base layer is formed from zirconia.

15. A method as claimed in claim 4, characterized in that the base layer is formed from quartz.

16. A method as claimed in claim 4, characterized in that an aperture in the base layer is provided by means of etching, which aperture is subsequently filled up with a soft-magnetic material for forming the flux-guiding element.

17. A method as claimed in claim 1, characterized in that the mechanochemical polishing treatment is performed with a colloidal suspension of $SiO_2$ particles in an alkali solution.

18. A method as claimed in claim 1, characterized in that the mechanochemical polishing treatment is performed with a mechanochemical polishing agent comprising a colloidal $SiO_2$ solution in which grains are present.

19. A method as claimed in claim 18, characterized in that an alkaline solution is used as an $SiO_2$ solution.

20. A method as claimed in claim 18, characterized in that grains are used which have an average particle size of less than 1.0 micrometer and a hardness which is greater than the hardness of $SiO_2$.

21. A method as claimed in claim 18, characterized in that diamond grains are used.

22. A method as claimed in claim 18, characterized in that a grain concentration of less than 1 g per liter is used in the colloidal solution.

23. A method as claimed in claim 2, characterized in that the support is formed from a soft-magnetic material.

24. A method as claimed in claim 5, characterized in that the base is formed from a soft-magnetic material.

25. A method as claimed in claim 5, characterized in that an aperture in the base layer is provided by means of etching, which aperture is subsequently filled up with a soft-magnetic material for forming the flux-guiding element.

26. A method as claimed in claim 6, characterized in that an aperture in the base layer is provided by means of etching, which aperture is subsequently filled up with a soft-magnetic material for forming the flux-guiding element.

27. A method as claimed in claim 14, characterized in that an aperture in the base layer is provided by means of etching, which aperture is subsequently filled up with a soft-magnetic material for forming the flux-guiding element.

28. A method as claimed in claim 15, characterized in that an aperture in the base layer is provided by means of etching, which aperture is subsequently filled up with a soft-magnetic material for forming the flux-guiding element.

* * * * *